M. J. WERNER.
TORPEDO PRESSURE GAGE.
APPLICATION FILED JUNE 6, 1914.
1,126,146.
Patented Jan. 26, 1915.
2 SHEETS—SHEET 1.
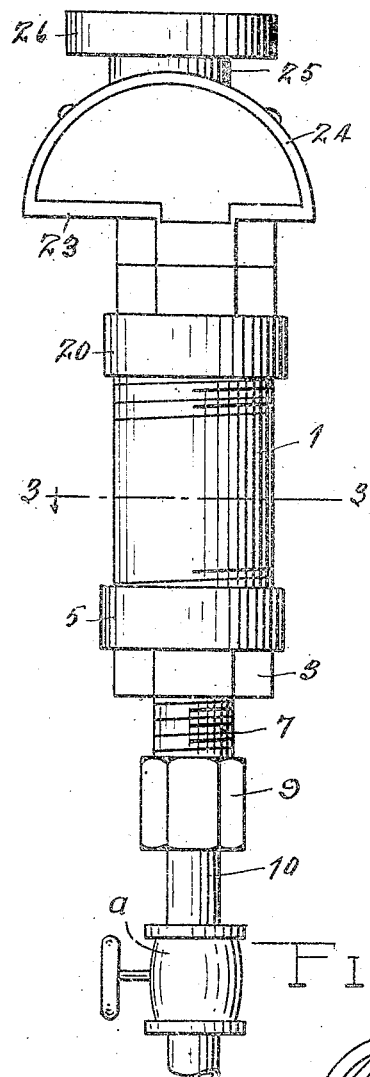
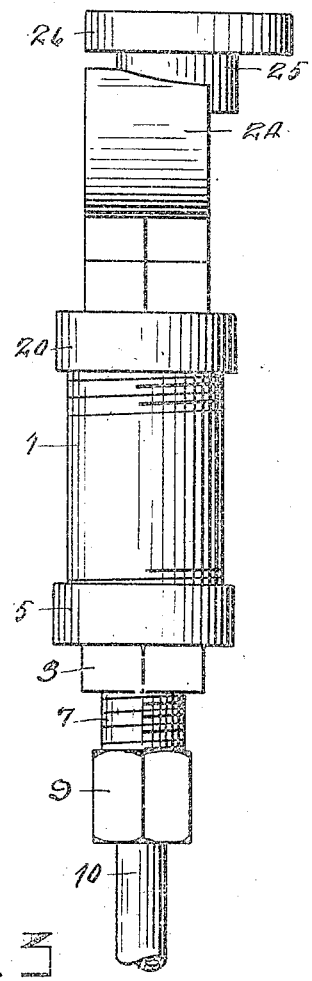
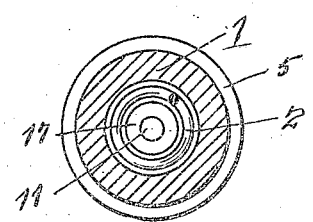
Inventor
M. J. Werner

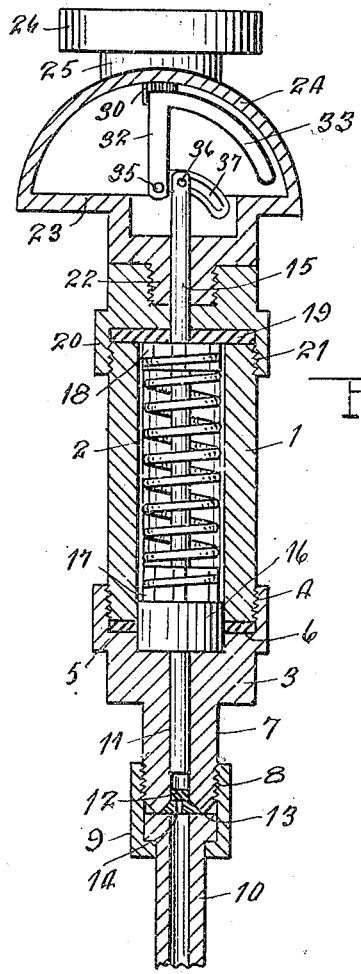
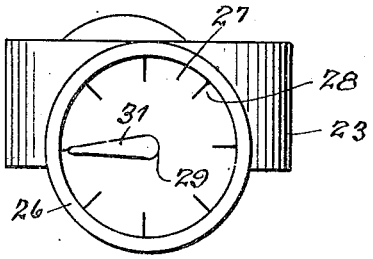
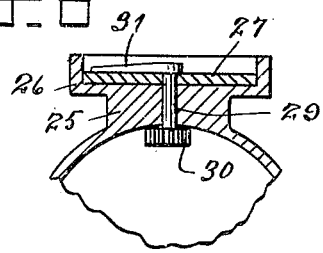
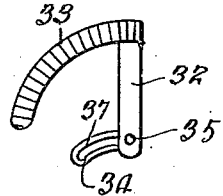

UNITED STATES PATENT OFFICE.

MARTIN J. WERNER, OF MANCHESTER, NEW HAMPSHIRE.

TORPEDO PRESSURE-GAGE.

1,126,146.

Specification of Letters Patent.

Patented Jan. 26, 1915.

Application filed June 6, 1914. Serial No. 843,549.

*To all whom it may concern:*

Be it known that I, MARTIN J. WERNER, a citizen of the United States, residing at Manchester, in the county of Hillsboro and State of New Hampshire, have invented certain new and useful Improvements in Torpedo Pressure-Gages, of which the following is a specification.

This invention relates to torpedo pressure gages, and one of the principal objects of the invention is to provide a pressure gage of comparatively simple construction which will reliably indicate the pressure of air upon automobile torpedoes, and which may be utilized for the purpose of indicating the pressure of gas or steam whenever desired to be used for the purposes.

There are many inconveniences incident to the firing of self-propelling or automobile torpedoes, or in preparing them ready for a run, owing to the absence of a permanent pressure gage connected directly to the torpedo and always ready to indicate the pressure in the air flask. Indicating accurately the pressure in the air flask during the charging, would avoid many serious accidents to the operator and would also lead to greater accuracy in the run.

This invention is intended as a permanent connection to the torpedo and obviates the present inefficient manner of securing the exact air pressure.

The objects and advantages referred to may be attained by means of the construction illustrated in the accompanying drawings, in which, Figure 1 is a side elevation of one form of pressure gage made in accordance with this invention, Fig. 2 is a view taken at right angles to Fig. 1, Fig. 3 is a sectional view taken on the line 3—3 of Fig. 1, looking in the direction indicated by the arrow, Fig. 4 is a central vertical section taken through the gage with the springs shown in elevation, Fig. 5 is a top plan view of the gage, Fig. 6 is a vertical sectional view of the dial and the pinion connected to the pointer, and a casing for said dial, and Fig. 7 is a side elevation of a gear quadrant for operating the pinion of the indicator hand.

Referring to the drawings, the numeral 1 designates a casing for a spring 2, and while a single spring is shown in the present instance, it will be understood that where a gage is required for a greater capacity, a plurality of springs mounted one within another, may be utilized. Connected to the lower end of the casing is a threaded cap or nipple 3 fitted by threads 4 to the lower end of the casing 1, and an interposed gasket or washer 5 is seated upon a shoulder 6 within the cap 3 and the lower end of the casing 1 bears against this gasket. The cap 3 is provided with a reduced portion 7 threaded at 8 upon its end, and fitted to said threaded portion 8 is a threaded union 9 to which is connected a pipe 10 which communicates with the main air line of the torpedo. The cap 3 is provided with a central bore 11, and fitted in the lower end of said bore is a leather washer 12 which is superposed upon a copper countersunk washer 13 having a central aperture 14 therein, to form a restricted air passage.

A piston rod or stem 15 extends centrally through the casing 1 and is provided with a circular head 16 which fits nicely within the casing 1, and forms a shoulder upon the upper side for supporting the spring 2. Said spring may rest upon a washer or collar 17 supported upon the head 16, while the opposite end of the spring bears against a similar washer 18 or against a shoulder 19 formed upon a cap or collar 20 connected by threads 21 to the upper end of the casing 1. The collar 20 is provided with a central bore through which the stem or rod 15 extends, and fitted in the upper end of the collar 20 is a boss 22 formed upon the reduced lower end of the casing or body portion 23 of the dial or indicator. The casing 23 is provided with a dome shaped upper surface 24 which is flat or plain upon the opposite sides thereof. Mounted on the top of the casing 23 is a dial support 25 provided with an annular flange 26. The dial 27 upon which are the indicating marks 28 is placed within the flange 26. A stub shaft 29 extending through the upper end of the casing 23 is provided upon its inner end with a pinion 30, while upon its outer end is a hand or pointer 31. A gear quadrant comprising the upright member 32 and the gear quadrant 33 is provided with a slotted and curved arm 34. The upright 32 is pivoted at the points 35, and the upper end of the piston rod or stem 15 is provided with a roller 36 mounted upon a pin which extends through the slot 37 in the curved element 34 to reduce the friction at this point. The quadrant gear 33 meshes with the pinion 30, and when the piston rod or stem 15 is forced upward by the pressure against the tension of the spring 2, the sector gear 33 is moved upon its pivotal point 35 to rotate the pinion 30 and the hand 31 around the dial 27, as will be readily understood. A suitable valve $a$ may be mounted in the pipe connection 10 so that the pressure may be cut off when it is not desired to use the gage or indicator.

From the foregoing it will be obvious that a torpedo pressure gage made in accordance with this invention can be readily connected to any form of torpedo and the desired pressure may be attained for any length of run, and thus obviates a tedious and uncertain operation heretofore necessary in determining the pressure in the torpedo.

It will also be obvious that the gage may be made of any suitable capacity to indicate in pounds zero to two thousand and five hundred pounds by duplicating the springs and mounting the same in substantially the manner referred to hereinbefore.

Various changes may be made in the details of construction without departing from the spirit and scope of the invention as defined in the claim.

What is claimed is:—

A torpedo pressure gage comprising a casing, a piston rod extending through the casing, a piston head on said rod, a spring mounted in the casing, a cap connected to the lower end of the casing into which the piston rod extends, a sector rack connected to the upper end of the piston rod, a slotted curved arm connected to said sector rack, a roller on said piston to engage said slot, a dial support, a dial on said support, a stud shaft extending through said dial, a hand on said shaft, and means whereby the movement of the spring will impart a rotative movement to the stud shaft for indicating the pressure on the dial.

In testimony whereof I affix my signature in presence of two witnesses.

MARTIN J. WERNER.

Witnesses:
 EDWARD T. LAMBERT,
 CHARLES REED FRANZ.